United States Patent [19]
Keiser

[11] 3,806,214
[45] Apr. 23, 1974

[54] BEARING ASSEMBLY HAVING A UNITIZED HUB

[75] Inventor: Thomas A. Keiser, North Canton, Ohio

[73] Assignee: The Timken Company, Canton, Ohio

[22] Filed: June 26, 1972

[21] Appl. No.: 266,068

[52] U.S. Cl. ............................................... 308/211
[51] Int. Cl. ............................................ F16c 35/06
[58] Field of Search .......... 308/190, 191, 210, 211, 308/214

[56] References Cited
UNITED STATES PATENTS
2,691,557   10/1954   Dean ................................. 308/211

2,750,238   6/1956   Block, Jr. .......................... 308/190

FOREIGN PATENTS OR APPLICATIONS
928,598   6/1963   Great Britain ...................... 308/221

Primary Examiner—Charles J. Myhre
Assistant Examiner—Frank Susko
Attorney, Agent, or Firm—Gravely, Lieder & Woodruff

[57] ABSTRACT

A bearing assembly for a wheel includes a spindle which carries a pair of indirectly mounted bearing cones. Each cone is encircled by a row of tapered rollers. A hub encircles the cones and rows of rollers and constitutes a weldment comprised of cup means having raceways along which the rollers ride and a flange which projects outwardly from the cup means.

9 Claims, 5 Drawing Figures

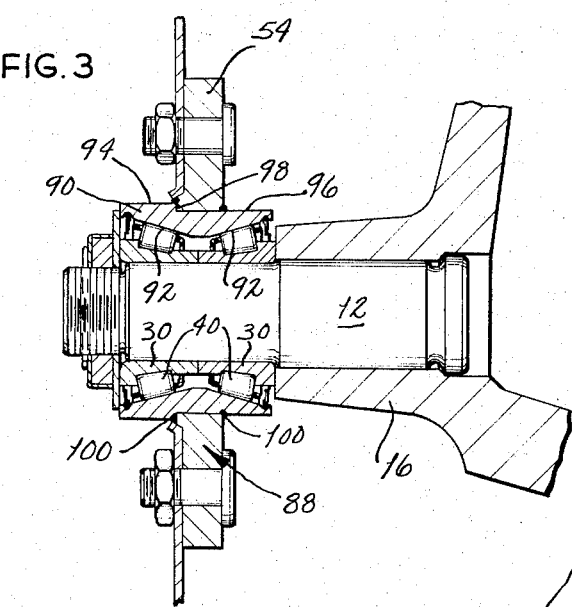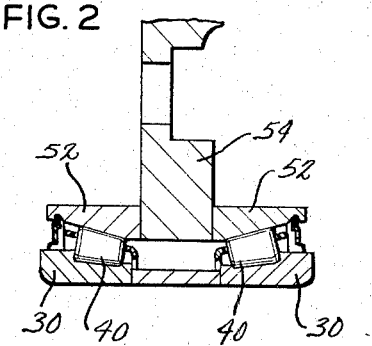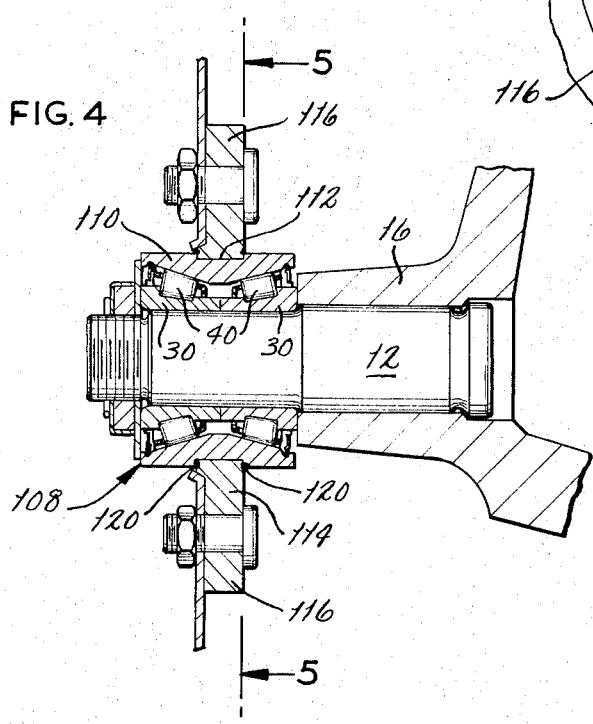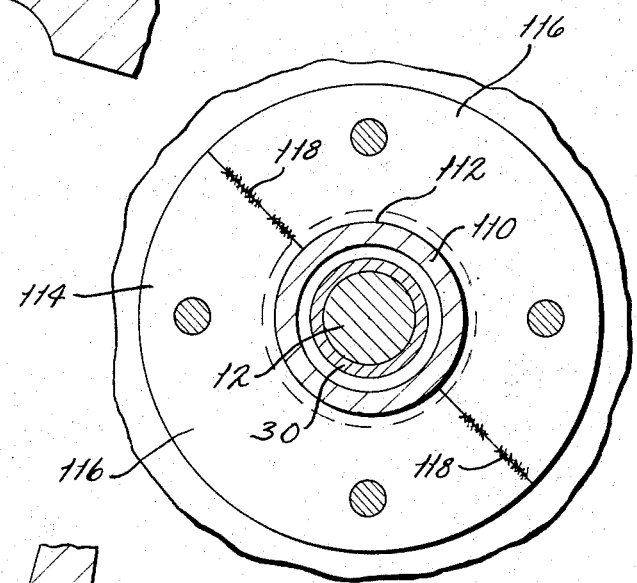

BEARING ASSEMBLY HAVING A UNITIZED HUB

BACKGROUND OF THE INVENTION

This invention relates to bearing assemblies and more particularly to a unitized hub having bearing races incorporated into it as an integral part thereof.

The bearings for the non-driven wheels of most motor vehicles are usually set into wheel hubs which rotate about spindles or axle ends. The typical wheel hub is a casting having radially directed flange to which the wheel is bolted, and this flange in addition carries a friction surface against which the brake shoes for the wheel operate. The casting has a relatively large number of machined surfaces, including machined bores opening out of each end. The outer races for the wheel bearings are pressed into these bores, and in most instances a lip-type seal is fitted into the inboard bore. Hence, considerable labor is required to finish a conventional wheel hub, and to assemble the wheel assembly of which it forms a part.

Heretofore attempts have been made to unitize the hub and outer bearing races primarily to reduce the number of machining and assembly operations. To do this, the races have been cast integral with the hub, but constructions of this nature have not proved altogether satisfactory since bearing steel is too expensive for the general hub construction, and the steel employed for the general hub construction is not suitable for the bearing races.

SUMMARY OF THE INVENTION

One of the principal objects of the present invention is to provide a hub assembly in which bearing races form an integral part thereof. Another object is to provide a hub which is ideally suited for mounting the wheels of motor vehicles. A further object is to provide a hub assembly of the type stated which is simple in construction and inexpensive to manufacture. An additional object is to provide a hub assembly of the type stated which includes a preadjusted, prelubricated and sealed bearing. These and other objects and advantages will become apparent hereinafter.

DESCRIPTION OF THE DRAWINGS

In the accompanying drawings which form part of the specification and wherein like numerals and letters refer to like parts wherever they occur.

FIG. 2 is a fragmentary sectional view of a hub having a central flange without annular reliefs and with the cups welded to the end faces of the flange;

FIG. 3 is a sectional view of a bearing assembly having a modified hub;

FIG. 4 is a sectional view of a bearing assembly having still another modified hub; and FIG. 5 is a sectional view taken along line 5—5 of FIG. 4.

DETAILED DESCRIPTION

Figure 1:
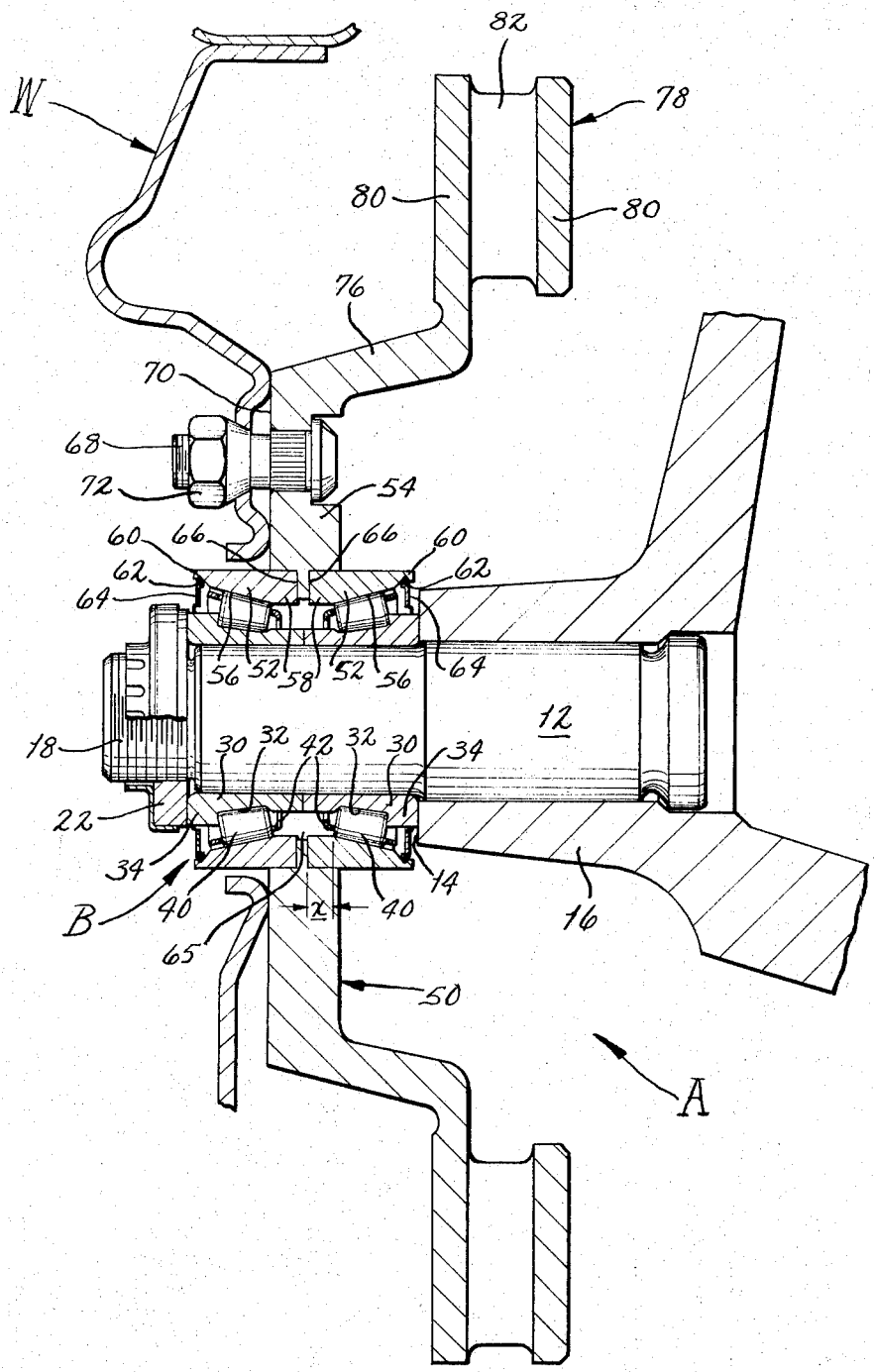
FIG. 1 is a sectional view of a bearing assembly provided with a hub constructed in accordance with and embodying the present invention.

Referring now in detail to the drawings (FIG. 1), A designates a bearing assembly for a non-driven wheel W of an automobile or other over-the-road vehicle, and that assembly includes a spindle 12 which projects beyond a shoulder 14 on a mount 16 for the spindle 12. At its outer end, the spindle 12 is reduced in diameter and provided with threads 18 over which a nut 22 is threaded.

The portion of the spindle 12 located intermediate the threads 18 and the shoulder 14 extends through a pair of tapered roller bearing cones 30 which are mounted in the indirect configuration. The cones 30 have outwardly presented tapered raceways 32 and thrust ribs 34, the latter being at the large diameter ends of the raceways 32. The front faces of the two cones 30 face each other and may or may not abut. The back face of the inboard cone 30 abuts the shoulder 14 on the spindle mount 16, while the back face of the outboard cone 30 abuts the nut 22. Thus, the two bearing cones 30 are contained between the nut 22 and the shoulder 14.

Positioned around the raceways 32 for the two cones 30 are rows of tapered rollers 40. Actually the frustoconical side faces of the rollers 40 engage the raceways 32, while their large diameter end faces bear against the thrust ribs 34. The proper circumferential spacing is maintained between adjacent rollers 40 in each row by cages 42, and the cages 42 further retain the rollers 40 on the cones 30 when the cones 30 are removed from the remainder of the bearing assembly A.

Encircling the cones 30 and the two rows of rollers 40 is a hub 50 which is in effect a weldment consisting of a pair of bearing cups 52 and a central flange 54 disposed between and welded to the cups 52. Each cup 52 has an inwardly presented tapered raceway 56 positioned directly opposite one of the cone raceways 32 and likewise engaged with the rollers 40 in the row along that cone raceway 32. Unlike conventional bearing cups, each cup 52 is extended a substantial distance beyond the smaller diameter end of its cup raceway 56 in the formation of an axially directed extension 58. The cup back face is at the end of this extension 58 and abuts against the flange 54. Beyond the large diameter end of its raceway 56, each cup 52 has a lip 60 provided with an inwardly opening groove 62 in which a lip-type seal 64 is retained. The lips of the seals 64 embrace the thrust ribs 34 of the cones 30.

The central flanges 54 has a center opening 65 and a pair of annular reliefs 66 which surround the center opening 55 and open axially outwardly. The axial extensions 58 of the cups 52 fit snugly into the annular reliefs 66 and are welded to the flange 54 at the outwardly facing surfaces of the reliefs 66. Thus, the cups 52 form the outer surface of the hub 50 and the reliefs 66 provide mechanical and environmental protection for the welds.

Outwardly from the cups 52 the flange 54 is fitted with a plurality of threaded studs 68 which are arranged in a circle and project beyond a flat abutment face 70 on the outboard side of the flange 54. The abutment face 70 is perpendicular to the axis of the spindle 12, and the wheel W is held against this face by means of nuts 72 which thread over the studs 68.

Beyond the studs 68 the flange 54 merges into an oblique section 76 which is formed integral therewith and is directed away from the wheel W. The oblique section 76, in turn, merges into a radially directed brake disk 78 having a pair of spaced walls 80 connected by webs 82. The outwardly exposed faces of the walls 80 are planar and are engaged by the shoes of a caliper-type brake (not shown). Those faces, therefore, constitute friction surfaces on the disk 78. Due to the presence of the oblique section 76, the brake disk 78 is set inwardly from the flange 54 and the wheel W. The space between the two annular walls 80 of the disk 78 facilitates cooling of the brake disk 78. Instead of the brake disk 78, the flange 54 may support a brake drum.

For the most part, the cups 52 are produced in accordance with conventional bearing manufacturing techniques. For example, bearing-quality alloy steel is first machined to the proper size and configuration and as such closely resembles the size and configuration of the finished cup 52. Next, the machined cup is subjected to case carburizing process which leaves the cup with a case hardened exterior surface and a softer and more ductile core. Thereafter, the raceway 56 is ground to the proper dimension, and some of the other exterior surfaces may also be ground. In any event, the grinding of these surfaces is relatively light and is clearly not deep enough to remove the case hardened layer. Finally, the cup back face at the end of the axial extension 58 is ground to completely remove the case hardened layer at that end of the cup 52.

The central flange 54 and the brake disk 78 are preferably a single casting or forging formed from a suitable low carbon steel which is considerably less expensive than the bearing steel utilized in the cups 52. The rough casting or forging for the flange 54 is machined to provide the planar friction surfaces on the spaced walls 80 of the disk 78, and to further provide the flat abutment face 70, and the annular reliefs 66 on the central flange 54.

After the foregoing machining and grinding operations, the bearing cups 52 are welded to the central flange 54 at the annular reliefs 66 thereon. Preferably, the welds joining the three pieces are friction welds, which are sometimes referred to as an inertia weld. Broadly speaking, a friction weld is achieved by holding one workpiece stationary, rotating the other workpiece which is to be joined to the stationary workpiece. Thereafter, the two workpieces are driven together with great force. The heat generated as a result of the friction between the two workpieces creates a weld, and the weld characteristics are dependent on the surface velocity, the moment of inertia, and the weld thrust pressure.

In the case of the hub 50, the flange 54 is held stationary and the cups 52 are clamped in chucks such that they align with the annular reliefs 66. Thereafter, the chucks are rotated until the desired surface velocity at the cup backface O.D. is reached. The desired velocity is determined by the mass of the chuck and cup as the energy of this system is converted into the friction weld. Next, the chucks are advanced toward the flange 54 by means of hydraulic actuators, whereupon the cups 52 enter the reliefs 66 and the cup backfaces bear against surfaces of the relief 66. The cups 52 are pressed against the flange 54 with the required force. The magnitude of this required force is a function of the weld size and the rotating energy of the cups 52.

The friction developed at the interface between the cups 52 and flange 54 raises the temperature at those interfaces to weld temperatures, and as a result the cups 52 are welded to the flange 54. The weld temperatures, however, last for only a fraction of a second, and therefore the metal does not liquify as it does in conventional welding processes. Since the weld temperatures last for only a short duration and the metal does not liquify to any great extent, the locked-in stresses induced by the welds are quite small in magnitude. Moreover, the axial extensions 58 on the cups 52 place the raceways 56 far enough from the area of the welds to prevent any stresses induced by the welds from extending or propagating into the raceways 56 and tempering the hardened surface. To avoid a heat affected zone at the raceway 52, the ground surface of the cup back face should be at least a distance x from the small diameter end of the cup raceway 56. The distance $x$ is dependent on the size and configuration of the bearing used. It is at least one-fourch inch for the size bearings used in typical motor vehicles such as passenger cars.

By way of example only, in a hub 50 for a typical passenger car installation, the distance $x$ between each cup raceway 92 and the cup back face is at least one-fourth inch, as previously mentioned. To effect the friction weld between the central flange 54 and cups 52 having outside diameters of 2.500 inch, the cups 52 are rotated until the surface velocity at the outer edges of the cup back faces reaches about 35 ft./sec. The chuck which holds and rotates each cup 52 has an inertial mass (weight times radius of gyration squared) of 20.95 lb. - ft.$^2$. The 2.500 inch O.D. cups 52 are then driven against the central flange with 18,000 to 20,000 pound force. The foregoing is given by way of example only, and it should be noted that the distance x, the surface velocity, the inertial mass, and the force vary with the size and nature of the hub 50.

The annular reliefs 66 may be omitted from the central flange 54, in which case the back faces of the cups 52 would be friction welded directly to the side faces of the central flanges 64 (FIG. 2).

In lieu of friction welding, the hub 50 may be assembled by means of electron beam welding also. In that case, the weld would be along the outwardly presented surface of each cup 52 at the outer edge of the annular relief 66 in the flange 54. The case carburized layer should be ground from the cup 52 in the vicinity of the weld. If the annular reliefs 66 are omitted from the central flange 54 the electron beam weld would be made between the back face of each cup 52 and the abutting faces of the flange 54.

The cups 52, the cones 30, and the tapered rollers 40 in combination form a bearing B for the bearing assembly A, and this bearing may be preadjusted or adjustable, depending upon the nature of the cones 30. If the front faces of the cones 30 abut within the hub 50 or else are separated by a shim or spacer to that the cones 30 are in a fixed and determined position relative to each other, then the bearing B is preadjusted, and the nut 22 merely serves to retain the bearing B on the spindle 12. On the other hand, if a void exists between the front faces of the two cones 30, then the cones 30 may be moved relative to one another and the relative position of the two cones 30, of course, determines the adjustment of the bearing B. In this case, the nut 22 not only serves to retain the cones 30 on the spindle 12, but also provides a means for adjusting the bearing B.

The cone 30 and rollers 40 may be installed in the cups 52 of the hub 50 by the manufacturer, and sold as a prelubricated unit. The seals 64 would of course retain grease within the cups 52 and further exclude water and other contaminants therefrom.

The hub 50 is considerably lighter than cast hubs of current design and manufacture. Moreover, it is manufactured with considerably fewer machining and assembly operations than conventional hubs.

The flange 54 may support a brake drum instead of the brake disk 78.

MODIFICATIONS

In a modified hub 88 (FIG. 3), a double cup 90 is employed in lieu of separate cups 52. Like the cups 52, the double cup 90 is formed from bearing steel which is subsequently case hardened. The cup 90 has two tapered raceways 92 thereon, one for each row of tapered roller bearings 40. In contrast to the cups 52 of the hub 50, the raceways 92 are merely two different surfaces on the same cup instead of on different cups. The outwardly presented side of the double cup 90 possesses a stepped configuration inasmuch as it is formed from a large diameter surface 94 and a smaller diameter surface 96 separated by a shoulder 98. The shoulder 98 is offset somewhat from the center of the cup 90. The flange 54 fits around the small diameter surface 96 and on one of its sides abuts against the shoulder 98. The flange 54 is attached to the double cup 90 at both ends of the flange 54 by two welds 100, preferably made by an electron beam welding process. The case carburized layer on the double cup 90 should be removed in the vicinity of the electron beam welds 100. Any stresses induced by the electron beam welds 100 do not propatate into the raceways 92 in view of the fact that the welds 100 are on the opposite side of the cup 90 from the raceway 92 and hence are located a substantial distance therefrom. The flange 54 may also be friction welded against the shoulder 98.

In another modified hub 108 (FIGS. 4 and 5), a double cup 110 is employed which is quite similar to the double cup 90. The double cup 110, however, on its outwardly presented side has a groove 112 which opens radially outwardly. The groove receives a split flange 114 consisting of two semi-circular segments 116. Initially, the semi-circular segments 116 are detached from one another and from the double cup 110. They are assembled on the cup 110 by fitting their inner margins into the groove 112, and when the segments 116 are so fitted, they will abut one another along radially extending lines of abutment. Thereafter, the segments 116 are joined to one another at welds 118 which can be made by any welding process compatible with the material of the segments 116. The split flange 114 which is so formed is further united with the double cup 110 at welds 120 which are along the outer edges of the groove 112. The welds 120 are preferably made by an electron beam welding process.

This invention is intended to cover all changes and modifications of the example of the invention herein chosen for purposes of the disclosure which do not constitute departures from the spirit and scope of the invention.

What is claimed is:

1. A bearing assembly comprising: a shaft;
a pair of indirectly mounted tapered roller bearing cones on the shaft;
retaining means for holding the cones on the shaft;
tapered rollers arranged in two rows with one row encircling one cone and the other row encircling the other cone; and a hub positioned around the rows of tapered rollers and including a pair of indirectly mounted tapered roller bearing cups and a member positioned between the bearing cups, the cups encircling the cones and having tapered raceways which contact the tapered rollers, the cups also having axial extensions beyond the small diameter ends of their raceways with the back faces of the cups being on the extensions and abutted against the member, the cups further being case hardened with the layer of case hardening being removed at the cup back faces, the member extending radially outwardly from the cups and the cups projecting axially beyond the member, the member and the cups being initially separate components which are joined together along the back faces of the cups by friction welding.

2. An assembly according to claim 1 wherein the member is a flange having end faces and the axial extensions on the cups abut against the end faces of the flange.

3. An assembly according to claim 1 wherein the flange has axially opening reliefs on each side thereof; and wherein the axial extensions of the cups fit into the reliefs.

4. A bearing assembly comprising:
a spindle;
inner race means mounted on the spindle and having a pair of outwardly presented raceways;
outer race means surrounding the inner raceways and having a pair of inwardly presented raceways located opposite the raceways on the inner race means, the outer race means being formed from bearing quality steel which is surface hardened;
rolling elements arranged in two circumferentially extending rows which are located between the inner and outer race means and are spaced axially from each other, the rolling elements contacting and being adapted to roll along the raceways of the inner and outer race means; and a flange friction welded to the outer race means generally intermediate the two raceways thereon, the flange projecting outwardly from the outer race means and being formed from a steel different than the bearing steel of the outer race means, the hardened surface being removed from the outer race means in the vicinity of the friction weld.

5. An assembly according to claim 4 wherein the flange extends radially inwardly past the outermost surface of the outer race means.

6. An assembly according to claim 4 wherein the outer race means is a unitary double cup having the two tapered raceways thereon.

7. An assembly according to claim 6 wherein the double cup has large and small diameter exterior surfaces and a shoulder between those exterior surfaces; and wherein the flange fits over the small diameter surface and abuts the shoulder.

8. A bearing assembly according to claim 4 wherein the inner race means comprises a pair of indirectly mounted bearing cones;
wherein the rolling elements are tapered rollers; and wherein the outer race means comprises a pair of indirectly mounted bearing cups positioned on each side of and abutting the flange.

9. A bearing assembly comprising:
a spindle;
a pair of indirectly mounted bearing cones on the spindle with each cone having outwardly presented tapered raceway and an end face located beyond the small diameter end of its tapered raceway;

a pair of indirectly mounted bearing cups surrounding the raceways of the cones and having inwardly presented tapered raceways located opposite the raceways on the cones, the cups being formed from bearing quality steel which is surface hardened;

tapered rollers arranged in two circumferentially extending rows which are located between the cups and cones and are spaced axially from each other, the tapered rollers contacting and being adapted to roll along the raceways of the cups and cones; and a flange positioned between the two cups and being abutted by and friction welded to the cups along the end faces of the cups, the flange projecting outwardly from the cups and being formed from a steel different than the bearing steel of the cups, the hardened surface being removed from the cups in the vicinity of the friction weld.

* * * * *